Feb. 11, 1964 T. E. POCHAPSKY 3,120,759
PRESSURE MEASURING DEVICES
Filed Sept. 21, 1962 3 Sheets-Sheet 1

INVENTOR.
THEODORE ELIAS POCHAPSKY
BY Edward F. Costigan
Louis B. Applebaum
ATTORNEYS Feb. 11, 1964    T. E. POCHAPSKY    3,120,759
PRESSURE MEASURING DEVICES
Filed Sept. 21, 1962    3 Sheets-Sheet 2

INVENTOR.
THEODORE ELIAS POCHAPSKY
BY
ATTORNEYS

INVENTOR.
THEODORE ELIAS POCHAPSKY

United States Patent Office 3,120,759
Patented Feb. 11, 1964

3,120,759
PRESSURE MEASURING DEVICES
Theodore Elias Pochapsky, Blauvelt, N.Y., assignor to the United States of America as represented by the Secretary of the Navy
Filed Sept. 21, 1962, Ser. No. 225,403
5 Claims. (Cl. 73—407)

This invention relates to the measurement of pressure and particularly to a device for use in measuring minute pressure fluctuations in a fluid.

In the past, absolute pressure measurements could not resolve a millionth of a pound pressure fluctuation when the measurement was made in a fluid at a pressure of hundredths or thousandths of a pound per square inch. Heretofore, no suitable device existed for use in measuring very small pressure fluctuations of a minute nature in a fluid, especially if the fluid was dense.

In general, pressure differences of a larger magnitude are usually measured by putting a diaphragm in a fluid and exposing each face to pressures at different points so as to get a differential reading. The manner of connecting these points can lead to serious errors and sensitive diaphragms can be easily damaged in field measurements.

The present device resolves the problem of measuring minute pressure fluctuations of a non-hydrostatic nature in the presence of tremendous hydrostatic pressures. The disadvantages heretofore encountered in the art are substantially overcome by the present invention, hereinbelow described, with particular reference to the application of this device at great depths below the sea, which is the most difficult use situs.

The subject invention relates to a device having a diaphragm operatively coupled to a lever mirror whose deflections are recorded photographically. In general, pressure differences are determined by the device by measuring the deflection of a thin aluminum diaphragm whose two faces are exposed to different pressures. The diaphragm is in operative contact with a mirror which is pivotally mounted on two closely spaced knife edges. Motion of the diaphragm is consequently translated into pivotal motion of the mirror and amplified movement of a light beam reflected by the mirror. The deflections of the light beam are recorded on a continuous moving photographic film and may be empirically translated into the fluctuation of pressure between the different faces of the diaphragm. This is due to the fact that the position of the image in the film is determined by the angle of the mirror which, in turn, is determined by the pressure difference across the diaphragm.

An object of this invention is to provide an apparatus for use in measuring minute pressure fluctuations in a continuous fluid.

Another object is to provide an apparatus for use in measuring minute pressure fluctuations of a non-hydrostatic nature in the presence of tremendous hydrostatic pressures.

A further object is to provide an apparatus for use in measuring minute pressure fluctuations at great depths below the sea.

Other objects and many of the attendant advantages of this invention will be readily appreciated as the same become better understood by reference to the following detailed description when considered in connection with the accompanying drawing, wherein.

Similar numerals refer to similar parts throughout the several views.

Figure 1:
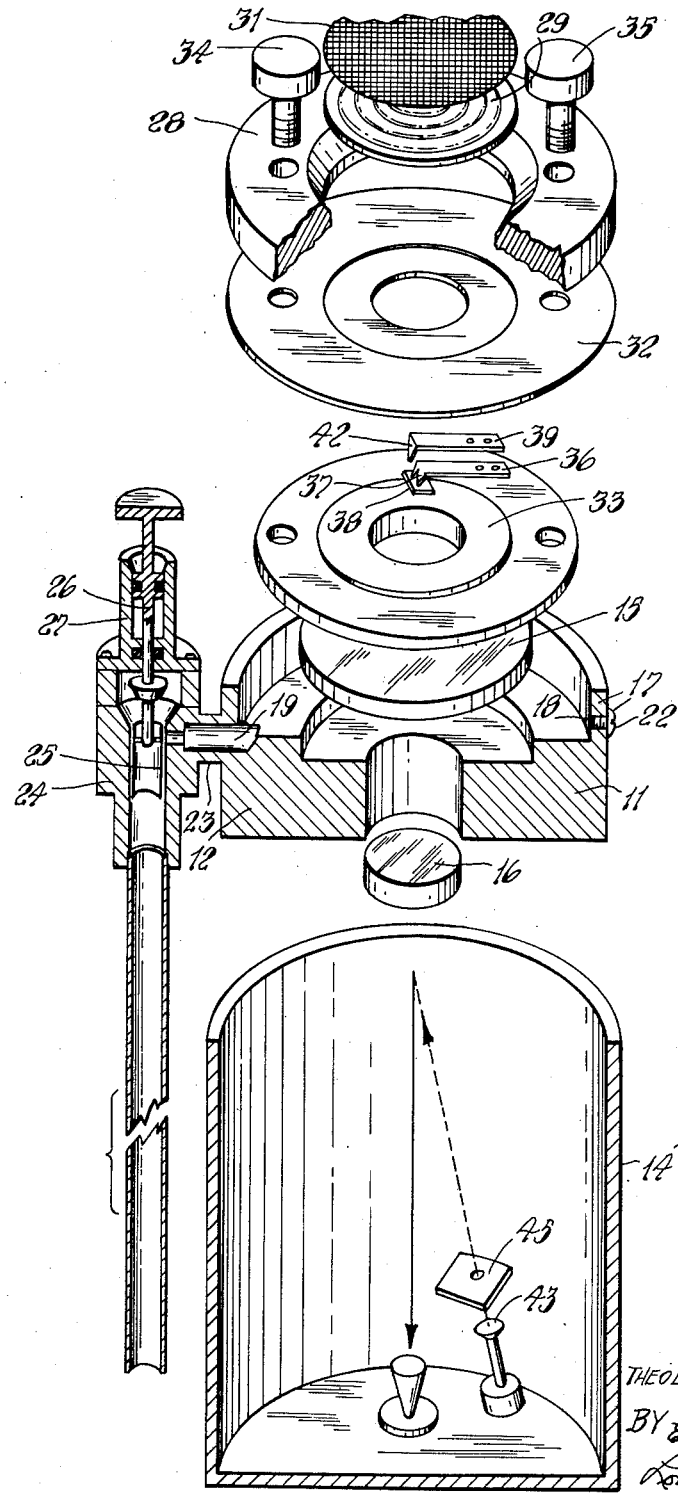
FIG. 1 is an exploded view of the present device, showing a preferred embodiment of the invention.
Figure 2:
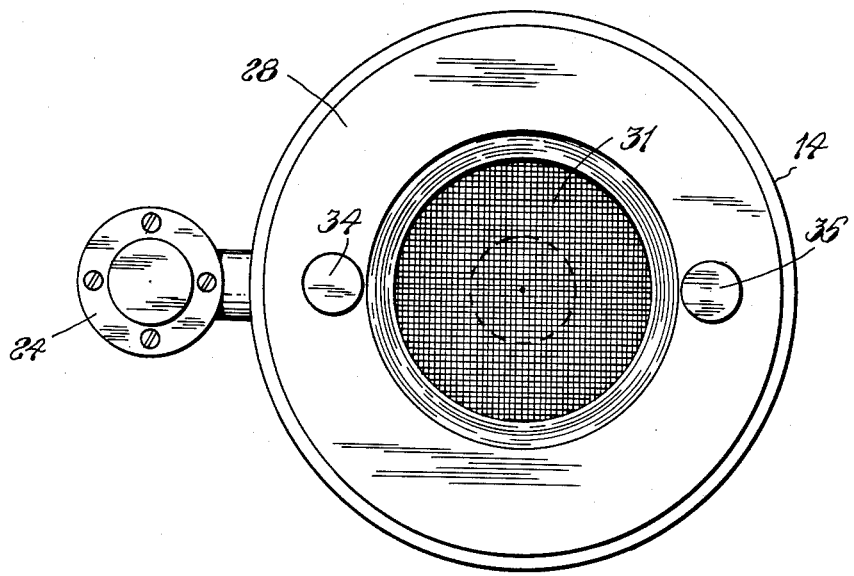
FIG. 2 is a top plan view of the assembled device.
Figure 3:
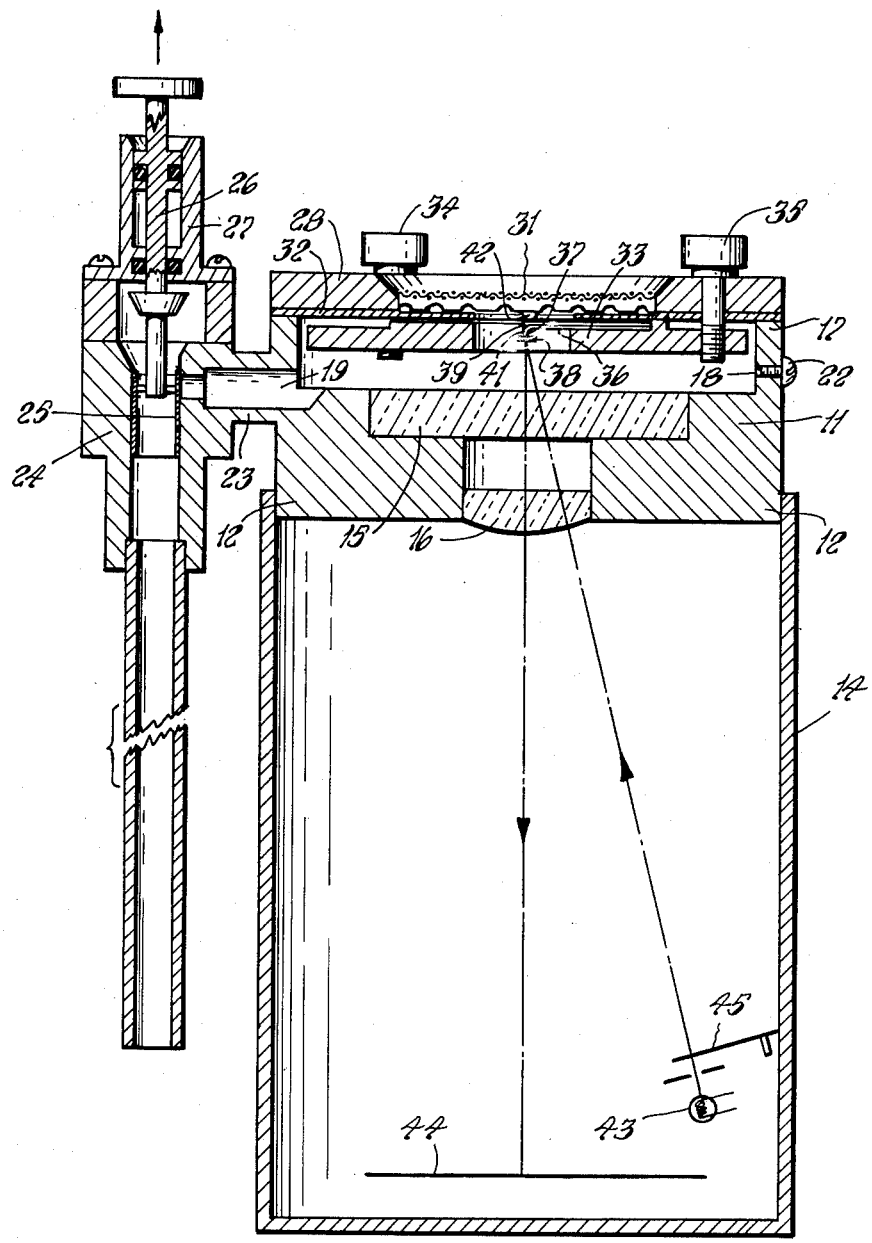
FIG. 3 is a side view taken on the line 2—2 of FIG. 2.

As shown in FIGS. 1 to 3, numeral 11 refers to a cylinder of open-end construction the lower end portion 12 of which is insertably mounted in the open-end of a cylindrical housing 14. The cylinder 11 functions as a well having a glass floor 15 bridging the area circumscribed by the mid-section of the cylinder 11, and a lens 16 bridging the area circumscribed by the lower end portion 12 of the cylinder 11. The upper end portion 17 of the body of the cylinder 11 is provided with a primary and secondary port 18 and 19 at a point above the upper surface of the glass floor 15. The primary port 18 is provided with a removable closure 22 and is used to initially fill the well with water prior to making measurements with the device. The secondary port 19 communicates with the lower arm 23 of a T-shaped tube 24.

The tube 24, at the intersection of the arms thereof, is provided with a slideable valve 25 which opens and closes arm 23 adjacent the secondary port 19. The valve 25 is operatively connected to and controlled by a pressure-actuated plunger 26 housed within the arm 27 adjacent the end portion thereof.

A primary circular band-like plate 28 having a diaphragm 29 bridging the area circumscribed by the inner periphery thereof is removably mounted on the upper extremital end of the cylinder 11. The diaphragm may be made of aluminum sheets 0.001 or 0.002 inch thick and four concentric circular corruptions should be embossed on each face to reduce warping. The outward movement of the diaphragm 28 is controlled by means of a grill 31 which also bridges the area circumscribed by the inner periphery of the plate 28 adjacent the outer surface of the diaphragm 29, while the inward movement of the diaphragm 29 is controlled by means of a second circular band-like plate 32 which lies intermediate the primary plate 28 and the upper extremital end of the cylinder 11 adjacent the inner surface of the diaphragm 29. The second circular plate 32 has an inside diameter less than that of both the primary plate 28 and the cylinder 11. A third circular band-like element 33 is adjustably mounted within the cylindrical well in adjacent relationship to the inner surface of the circular plate 32 and the diaphragm 29. The screws 34 and 35, which pass through the body portion of both the primary and secondary plates 28 and 32, are used to raise or lower the third circular plate 33 with respect to the second plate 32 and the diaphragm 29. The outside diameter of the third plate 33 is less than the inside diameter of the upper portion 17 of the well 11 but the inside diameter is substantially the same size as that of the third circular plate 33.

A cantilever 36 of a rigid nature is mounted on the upper surface of the third circular plate 33 in such a manner that it extends into the area bounded by the inner periphery of the second and third plates 32 and 33. The free end of the cantilever terminates in two down-turned knife edges 37 upon which the backside of a mirror 38 is pivotally mounted. A cantilever 39 of a flexible nature is mounted above the rigid cantilever 36 in such a manner that the free end of the flexible cantilever, which terminates in a down-turned point 42, lies intermediate the knife-edges 37 of the rigid cantilever 36 adjacent the backside of the mirror 38. The third circular plate 33 may be raised by means of screws 34 and 35 so that the upper surface of the flexible cantilever 39 may be brought into contact with the tip of the accentuating point or spear 42 mounted on the inner surface of the diaphragm. Thus, a movement of the diaphragm would be transmitted through the accentuating point 42 to the free end of the flexible cantilever 39 which will be pushed in a downward direction. As a result, the point 41 of the flexible cantilever 39 will contact and pivot the mirror 38 mounted on the knife-edges 37 of the fixed cantilever 36.

A light source 43 and a pictorial recording means 44 is housed in the lower portion of the cylindrical housing 14. The bulb, which functions as the light source 43, should have a straight filament and should be mounted with the axis of the filament along the optical path so that a small image is obtained. The light is collimated near the bulb by having it pass through a hole in an object such as a 60 second watch 45. In this manner a narrow beam can be directed to the mirror 38 through the lens 16 and the glass floor 15. The mirror 38 in turn will reflect the light back through the glass floor 15 and the lens 16 to the pictorial recording means 44. The hand of the watch 45 will block the passage of light for a second out of every minute and these interruptions will produce timing marks on the photographic trace.

In operation: The closure 22 in the side of the well 11 and the sliding valve 25 in the tube 24 are opened. The device is then slowly lowered into the liquid to be measured in such a manner that the liquid enters the primary port 18. The well 11 is slowly filled and the overflow leaves the well 11 through the sliding valve 25 at which time the primary port 18 is sealed with the closure 22. At this stage, the interior of the well is completely filled with the fluid and the exterior of the device is also bathed in the fluid so that the tube is filled with water. Due to the fact that the sliding valve is opened, the fluid in the well has free access to the fluid in the tube 24. The diaphragm 29 is consequently under no pressure differential and the device can be adjusted to read zero.

Zeroing is accomplished by adjustment of the screws 34 and 35 which moves the knife edge assembly relative to the accentuated point 42 which is integral with the center of the diaphragm 29. The point of the spear is allowed to rest on the upper surface of the flexible cantilever 39 such that the pointed end 41 of the flexible cantilever, which is intermediate the knife edges of the fixed cantilever 36, has a few thousandths of an inch away from the back of the mirror 38. After this task is accomplished, the sliding valve 25 is moved so as to seal the well and the sealed water in the well functions as a stiff spring.

As the device is lowered further down into the liquid, the hydrostatic pressure is increased and the pressure-actuated plunger 26 is forced into the tube resulting in the opening of the sliding valve 25. At this point, the well is open to outside fluid through the long arm of the T-shaped tube 24 resulting in the inner surface of the diaphragm being exposed to the pressure at the far end of the arm. Due to the fact that the fluid in the well and tube are identical to that of the outside medium, the diaphragm does not respond to hydrostatic pressure. However, a small pressure fluctuation at the diaphragm or open end of the tube will move the diaphragm.

A beam from the collimated light source 43 is directed to the sensing mirror 38 through the lens 16 and the glass floor 15. The light is reflected from the mirror 38 back through the glass floor 15 and lens 16 to a moving strip of film 44. An image of the bulb filament appears on the film at a position determined by the angle of the mirror on the fixed knife edges. This latter angle is controlled by the point 41 of the flexible cantilever which, in turn, is controlled by the lateral movement of the tip of the accentuated point 42 which is responsive to the lateral movement of the diaphragm 29. Thus, a small pressure fluctuation at this outer surface of the diaphragm on the open end of the tube 24 will move the diaphragm and this lateral movement will be translated into a pivotal movement of the mirror resulting in the movement of the beam of light reflected by the mirror. As a result, the position of the image in the photographic film will be an indication of the pressure fluctuation encountered during the test.

The sensitivity of the gauge is such that precautions must be taken to keep the instrument on scale. In particular, hydrostatic heads must be avoided, and the diaphragm should be bathed in the same liquid on either of its sides. The interior of the gauge is flooded with water in a small tank, and the necessary mirror adjustments are made at this time. Provision is made to keep the water from leaking out of the gauge when the assembly is removed from the water. When the sliding valve is slid to seal the opening to the gauge interior, no change takes place in the volume of the trapped water, and the mirror position remains the same. Generally, the bulb image moves approximately ¼ of the full scale when the unit is removed from the tank and allowed to stand in air. This backing of the diaphragm by a relatively incompressible volume of water serves to protect the sensitive element, and water can be spilled liberally over the exterior without harmful effects.

After the gauge is re-immersed in the water environment to be studied, the sliding valve is opened. This is accomplished, as heretofore described, by using a pressure-actuated piston to slide the valve cylinder. The gauge interior is now made to open into a long pipe, and the rear of the diaphragm is exposed to the pressure at the far end of the tube. If air were present in the tube, it would probably cause the light to go off scale. For this reason, the pipe is initially open at both ends and purged of air as the apparatus is lowered into the water. At operating depth, the hydrostatic pressure is such that the pressure-actuated piston forces a seal against the open end of the tube near the diaphragm.

It is apparent from the foregoing description and drawings that I have invented a device of improved construction for use in measuring minor pressure fluctuations in a continuous fluid. It has been found that this device will respond to slowly fluctuating pressure differences. Obviously, many modifications and variations of the present apparatus are possible in the light of the above teachings. It is therefore to be understood that the invention, as set forth within the scope of the appended claims, may be practiced otherwise than as specifically described.

I claim:

1. A pressure measuring device comprising in combination:

a well having a transparent floor;

a three-arm tube, one of said arms communicating with the interior of said well;

a valve housed within said tube at the intersection of said arms controlling the opening and closing of said arm communicating with said well;

a pressure-actuated element for control of said valve housed within one of the other of said arms of said tube;

a diaphragm bridging the mouth of said well,
said diaphragm being responsive in movement to differentials in pressure along the upper surface thereof and to differentials in pressure at the end portion of the last of said arms of said tube when said well is filled with water and said arm communicating with said well is open;

a rigid cantilever housed within said well adjacent said diaphragm;

a reflective device pivotally mounted on the free end of said cantilever;

a movable cantilever mounted in cooperative relationship over said rigid cantilever,
said movable cantilever controlling the pivotal movement of said mirror;

a contact element integral the undersurface of said diaphragm controlling the movement of said movable cantilever;

a lens mounted below said transparent floor;

a light source directing a beam through said lens and said transparent floor to said mirror;

a pictorial recording device in receptive position to record said beam reflected from said mirror through said transparent floor and said lens.

2. A pressure measuring device comprising, in combination:

a well having a glass floor;

a T-shaped exterior tube whose lower arm communicates with the interior of said well;

a sliding valve housed within said tube at the intersection of the arms thereof for the opening and closing of said lower arm;

a pressure-actuated plunger housed within the end portion of one of the free arms of said T-shaped tube,
    said plunger in touch control of the movement of said valve;

a lid-like diaphragm bridging the mouth of said well,
    said diaphragm responsive in movement to differentials in pressure along the upper surface thereof and to differentials in pressure at the end portion of the other of said free arms of said tube when said well is filled with water and said lower arm of said tube is open;

a rigid cantilever housed within said well adjacent the inner surface of said diaphragm;

a mirror pivotally mounted on the extremital end of said rigid cantilever;

a movable cantilever operatively mounted above said rigid cantilever,
    said movable cantilever having a laterally movable extremital end in touch control of the pivotal movement of said mirror;

a contact element integral the underside of said diaphragm,
    said contact element in touch control of the lateral movement of the extremital end of said movable cantilever;

a lens mounted adjacent the undersurface of said glass floor;

a light source directing a collimated beam towards said lens,
    said lens directing said beam through said glass floor to said mirror within said well;

a camera in negative position to record said beam reflected from said mirror through said glass floor and said lens to said camera.

3. A pressure measuring device comprising, in combination:

a cylindrical well having a glass floor;

dual ports in the side of said well,
    one of said ports adapted to allow fluid to enter said well, said port provided with a resealable closure;

a T-shaped exterior tube whose lower arm communicates with the other of said ports;

a sliding valve housed within said T-shaped tube at the intersection of the arms thereof,
    said valve controlling the opening and closing of said lower arm;

a pressure actuated plunger housed within the end portion of one of the free arms of said T-shaped tube,
    said plunger communicating with said valve thereby controlling the movement of said valve;

a circular band-like cover mounted on the mouth of said well;

a diaphragm bridging the area circumscribed by the inner periphery of said cover;
    said diaphragm responsive in movement to differentials in pressure along the upper surface thereof and inner surface thereof, said pressure differential along the inner surface of said diaphragm originating at the end portion of the other of said free arms of said T-shaped tube when said well is filled with water and said lower arm is open;

a rigid cantilever housed within said well adjacent the inner surface of said diaphragm,
    the free end of said cantilever provided with dual down-turned knife edges;

a mirror the backside of which is pivotally on said knife edges;

a movable cantilever operatively mounted upon said rigid cantilever,
    said movable cantilever having a laterally movable free-end communicating with the back of said mirror thereby controlling the pivotal movement of the same;

a contact element integral the underside of said diaphragm,
    said contact element communicating with the free end of said movable cantilever thereby controlling the lateral movement of said free end responsive to movement of said diaphragm,
    said free end in turn controlling the pivotal movement of said mirror, a lens mounted in adjacent relationship below said glass floor;

a light source whose beam is directed towards said lens,
    said lens directing said beam through said glass floor to said mirror within said well;

a camera in receptive position to record said beam reflected from said mirror through said glass floor and said lens to said camera.

4. A pressure measuring device comprising, in combination:

a cylindrical well having a glass floor;

dual ports in the side of said well,
    one of said ports for the initial ingress of water into said well, said port provided with a releasable closure;

a T-shaped exterior tube whose lower arm communicates with the interior of said well through the other of said ports;

a sliding valve housed within said T-shaped tube at the intersection of the arms thereof,
    said valve controlling the opening and closing of said lower arm;

a pressure actuated plunger housed within the end portions of one of the free arms of said T-shaped tube,
    said plunger communicating with said valve thereby controlling the movement of said valve, a circular band-like cover mounted on the mouth of said well;

a diaphragm bridging the area circumscribed by the inner periphery of said cover;
    said diaphragm responsive in movement to differentials in pressure along the outer and inner surface thereof,
    said pressure differentials along the inner surface of said diaphragm originating at the end portion of the other free arm of said T-shaped tube when said well is filled with water and said lower arm of said tube is open;

a grill bridging the area circumscribed by the inner periphery of said band-like cover in adjacent relationship to the upper surface of said diaphragm,
    said grill controlling the extent of upward movement of said diaphragm;

a circular band-like backing plate intermediate said cover and the mouth of said well,
    said plate controlling the downward movement of said diaphragm;

a rigid cantilever housed within said well adjacent the inner surface of said diaphragm,
    the free end of said cantilever provided with dual down-turned knife edges;

a mirror having a back pivotally mounted on said knife edges;

a movable cantilever mounted upon said rigid cantilever,
    said movable cantilever having a laterally movable free end communicating with said back of said mirror;

a contact element integral the underside of said diaphragm,
    said contact element communicating with the free end of said movable cantilever thereby controlling the lateral movement of said free end responsive to movement of said diaphragm,
        said free end in turn controlling the pivotal movement of said mirror;

a lens mounted in adjacent relationship below said glass floor;

a light source whose beam is directed towards said lens,
    said lens directing said beam through said glass floor to said mirror within said well;

a camera in receptive position to record said beam reflected from said mirror through said glass floor and said lens to said camera.

5. A primary cylinder having an open end;

a second cylindrical element having an upper end and a lower end of open construction,
    said lower end fitted air tightly into said open end of said primary cylinder and said upper end portion adapted with a primary and a secondary resealable port;

an exterior tube communicating with said primary port;

a slidable valve housed within said tube adjacent the entrance of said primary port;

a pressure actuated plunger housed within the upper end portion of said tube communicating with said valve to open and close said primary port;

a circular glass floor bridging the area below said ports circumscribed by the mid-section of said second cylindrical element;

a primary circular band-like plate removably mounted on the upper extremital end of said second cylindrical element;

a second circular band-like element intermediate said primary plate and said cylinder,
    said second band-like element having an inside diameter greater than that of said primary band-like plate;

a diaphragm bridging the area circumscribed by the inner periphery of said primary circular band-like element,
    said diaphragm having an inner surface whose outer peripheral area lies in adjacent relationship to the inner peripheral area of said second circular plate;

a grill bridging the area circumscribed by the inner periphery of said primary circular element in adjacent relationship to the outer surface of said diaphragm;

a third circular band-like element adjustably mounted within said second cylindrical element adjacent the inner surface of said second circular band-like plate,
    said third circular band-like element having an outer periphery of smaller diameter than the inner periphery of said second cylindrical element and an inner periphery of substantially the size of the inner periphery of said second circular plate;

a rigid cantilever terminating in dual down-turned knife edges mounted on the upper surface of said third circular band-like element;

a mirror whose inner surface is pivotally mounted on said dual knife edges;

a flexible cantilever mounted in space relationship on the upper surface of said rigid cantilever,
    said flexible cantilever terminating in a down turned point positioned intermediate said dual knife edges,
        said point in touch control of the leverage of said mirror on said dual knife edges;

a spear head integral the central portion of the inner surface of said diaphragm,
    said spear head capable of controlling the movement of said flexible cantilever in response to movement of said diaphragm;

a lens bridging the area circumscribed by said inner cylinder adjacent the lower surface of said glass floor;

a collimated light source housed in the lower portion of said primary cylinder,
    said light directed towards said lens,
        said lens directing said light towards said mirror; and a pictorial recording means housed in said outer cylinder in receptive position to light reflected from said mirror through said lens.

No references cited.